United States Patent [19]

Maresca

[11] Patent Number: 5,106,921
[45] Date of Patent: Apr. 21, 1992

[54] REACTIVE POLYCARBONATE CHAIN TERMINATED WITH HYDROXY PHENYL OXAZOLINE

[75] Inventor: Louis M. Maresca, Schenectady, N.Y.

[73] Assignee: General Electric Company, Mt. Vernon, Ind.

[21] Appl. No.: 447,767

[22] Filed: Dec. 7, 1989

Related U.S. Application Data

[62] Division of Ser. No. 280,846, Jan. 30, 1989, Pat. No. 4,940,711.

[51] Int. Cl.$^5$ ............................................. C08G 64/12
[52] U.S. Cl. ................................. 525/462; 525/433; 525/436; 525/439; 528/198
[58] Field of Search ............... 525/462, 433, 436, 439

[56] References Cited

U.S. PATENT DOCUMENTS 4,940,771  7/1990  Maresca ................ 525/462

Primary Examiner—Harold D. Anderson
Attorney, Agent, or Firm—Martin Barancik

[57] ABSTRACT

Polycarbonate and polyarylate resins are chain-terminated with a group selected from those of the formula:

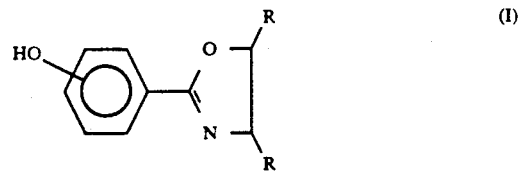

(I)

wherein each R independently represents one of hydrogen or lower alkyl. The resins are reactive polycarbonates, poly(ester carbonates) and polyarylates, useful as intermediates in the preparation of block and graft copolymers, with other polymers having functional, reactive groups.

7 Claims, No Drawings

REACTIVE POLYCARBONATE CHAIN TERMINATED WITH HYDROXY PHENYL OXAZOLINE

This is a division of copending application Ser. No. 280,846, filed Jan. 30, 1989 now U.S. Pat. No. 4,940,711.

BACKGROUND OF THE INVENTION

1. Field of The Invention

The invention relates to aromatic carbonate and polyarylate polymers of controlled molecular weight and more particularly relates to such polymers end-capped with a hydroxyaryloxazoline.

2. Brief Description of the Prior Art

It is known that in certain procedures of producing aromatic carbonate, ester-carbonate and polyarylate polymers from dihydric phenols, a carbonate precursor such as phosgene, and/or an aromatic diacid such as isophthalic or terephthalic acid, small amounts of weight regulators (chain terminators) can be used to provide end or terminal groups on the polymer and thereby control the molecular weight. Such materials include monofunctional phenols such as phenol and p-tertiary-butylphenol. The purpose of using a chain terminator has been to affect physical properties of the polymer, such as melt flow characteristics and thermal stability.

The prior art also disclosed several other types of compounds that act as chain terminators for the carbonate, ester carbonate or polyarylate polymers. Thus, U.S. Pat. No. 3,085,992 discloses alkanolamines as chain terminators; U.S. Pat. No. 3,399,172 teaches imides as chain terminators; U.S. Pat. No. 3,275,601 discloses that aniline and methylaniline function as chain terminators in the interfacial polymerization process for producing polycarbonates; and U.S. Pat. No. 4,001,184 discloses primary and secondary amines as molecular weight regulators for polycarbonate. Furthermore, U.S. Pat. No. 3,028,365 discloses that aromatic amines and other monofunctional amine compounds can be used to control or regulate the molecular weight of polycarbonates, thereby forming aryl urethane terminal groups. Aromatic polycarbonates having urethane end groups are disclosed in U.S. Pat. No. 4,111,910. These polycarbonates are prepared using a terminating amount of ammonia, ammonium compounds, primary cycloalkyl or aralkyl amines and secondary cycloalkyl, alkyl or aralkylamines.

I have found that polycarbonate and polyarylate resins prepared by the known interfacial polymerization method may be end-capped with hydroxyaryloxazolines to control molecular weight. In addition to affecting desirable physical properties, advantageously, the end-capped polymer chains are reactive and can subsequently react with a wide variety of other polymers bearing functional groups such as carboxylic acids, anhydrides, phenolic hydroxyls, amines, mercaptans, epoxides and like groups. It is our belief that no one has disclosed the use of a terminator which can subsequently react with other polymers. The reactive polycarbonate resins of the invention are uniquely reactive with a wide variety of polymers and may be used to form block and graft copolymers with appropriate functionalized polymers. The block and graft copolymers so prepared have excellent property profiles and are useful as injection molding and extrusion resins or as compatibilizers for polycarbonate or polyarylate resin blends.

SUMMARY OF THE INVENTION

The invention comprises an aromatic polycarbonate or polyarylate resin having a polymer chain terminated with a monovalent group of the formula:

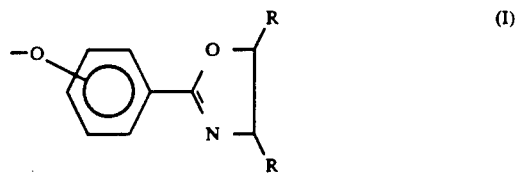

wherein each R independently represents one of hydrogen or lower alkyl. The term "lower alkyl" as used herein means alkyl having from 1 to about 6 carbon atoms, inclusive, such as methyl, ethyl, propyl, butyl, pentyl, hexyl and isomeric forms thereof. The polymers of the invention are useful as thermoplastic resins, and as intermediates in the preparation of block and graft copolymers by solution or melt blending procedures.

DETAILED DESCRIPTION OF THE PREFERRED EMBODIMENTS OF THE INVENTION

Polycarbonate resins and their method of preparation by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparitive processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,1-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like.

The preferred process for preparing polycarbonate resins of the invention comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present.

The dihydric phenols employed are known, and the reactive groups are the two phenolic hydroxyl groups.

Some of the dihydric phenols are represented by the general formula:

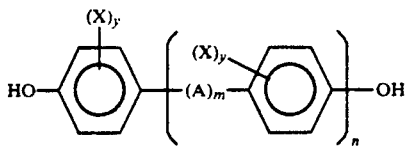

wherein A is a divalent hydrocarbon radical containing from 1 to about 15 carbon atoms; a substituted divalent hydrocarbon radical containing from 1 to about 15 carbon atoms and substituent groups such as halogen;

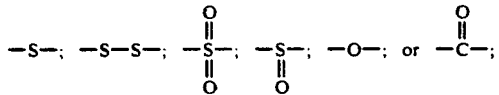

wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an oxyalkyl group of from 1 to about 8 carbon atoms, or an oxyaryl group of from 6 to 18 carbon atoms; and wherein m is zero or 1 and n is an integer of from 0 to 5.

Typical of some of the dihydric phenols that can be employed in the practice of the present invention are bis-phenols such as (4-hydroxyphenyl) methane, 2,2-bis (4-hydroxyphenyl) propane (also known as bisphenol-A), 2,2-bis (4-hydroxy-3,5-dibromophenyl) propane; dihydric phenol ethers such as bis (4-hydroxyphenyl) ether, bis (3,5-dichloro-4-hydroxyphenyl) ether; dihydroxydiphenyls such as p,p'- dihydroxydiphenyl, 3,3'-dichloro-4,4'-dihydroxydiphenyl; dihydroxyaryl sulfones such as bis (4-hydroxyphenyl) sulfone, bis (3,5-dimethyl-4-hydroxyphenyl) sulfone, dihydroxy benzenes such as resorcinol, hydroquinone, halo- and alkyl-substituted dihydroxy benzenes such as 1,4-dihydroxy-2,5-dichlorobenzene, 1,4-dihydroxy-3-methylbenzene; and dihydroxydiphenyl sulfides and sulfoxides such as bis (4-hydroxyphenyl) sulfide, bis (4-hydroxyphenyl) sulfoxide and bis (3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with a glycol such as ethylene glycol.

The carbonate precursor can be either a carbonyl halide, or a bishaloformate. The carbonyl halides include carbonyl bromide, carbonyl chloride, and mixtures thereof. The bishaloformates include the bishaloformates of dihydric phenols such as bischloroformates of 2,2bis(4-hydroxyphenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates These randomly branched polycarbonates are prepared by coreacting a polyfunctional organic compound with the aforedescribed dihydric phenols and carbonate precursor. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, 1,3,5-trihydroxybenzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic dianhydride, and the like. The preferred polyfunctional aromatic compounds are 1,1,1-tri(4-hydroxyphenyl) ethane, trimellitic, anhydride or trimellitic acid or their haloformyl derivatives. Also included herein are blends of a linear polycarbonate and a branched polycarbonate.

The term "polycarbonate" as used herein is inclusive of poly(ester-polycarbonates), i.e., resins which contain, in addition to recurring polycarbonate chain units of the formula:

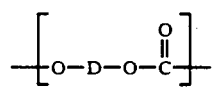 (IIa)

wherein D is a divalent aromatic radical of the dihydric phenol employed in the polymerization reaction, repeating or recurring carboxylate units, for example of the formula:

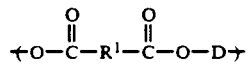 (IIb)

wherein D is as defined above and $R^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent.

In general, any dicarboxylic acid conventionally used in the preparation of linear polyesters may be utilized in the preparation of the poly(ester-carbonate) resins of the instant invention. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

$$HOOC-R^1-COOH \qquad (III)$$

wherein R¹ represents a divalent aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

—E— wherein E is a divalent alkylene or alkylidene group. E may also consist of two or more alkylene or alkylidene groups, connected by a non-alkylene or alkylidene group, connected by a non-alkylene or non-alkylidene group, such as an aromatic linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene; a sulfur-containing linkage, such as sulfide, sulfoxide or sulfone, an ether linkage, a carbonyl group; a direct bond; or a silicon-containing linkage such as silane or siloxy. Other groups which E may represent will occur to those skilled in the art. For purposes of the present invention, the aromatic dicarboxylic acids are preferred. Thus, in the preferred aromatic difunctional carboxylic acids, R¹ is an aromatic radical such as phenylene, biphenylene, naphthylene, or substituted phenylene. Some non-limiting examples of suitable aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups. Y may be an inorganic atom such as chlorine, bromine, fluorine and the like, an organic group such as the nitro group; an organic group such as alkyl or aryl, or an oxy group such as alkoxy, it being only necessary that Y be inert to and unaffected by the reactants and the reaction conditions. Particularly useful aromatic dicarboxylic acids are those represented by the general formula:

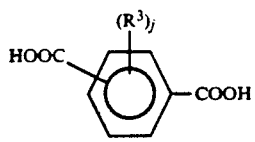

(IV)

wherein j is a positive whole integer having a value of from 0 to 4 inclusive; and each R³ is independently selected from the group consisting of alkyl radicals, preferably lower alkyl radicals (containing from 1 to about 6 carbon atoms).

Mixtures of these dicarboxylic acids may be employed. Therefore, where the term dicarboxylic acid is used herein it is to be understood that this term includes mixtures of two or more different dicarboxylic acids.

Most preferred as aromatic dicarboxylic acids are isophthalic acid, terephthalic acid, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the poly(ester-carbonate) resins of the invention will vary in accordance with the proposed use of the product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol-A reacting completely with 4 moles of isophthaloyl dichloride and 1 mole of phosgene would give a poly(ester-carbonate) of 80 mole percent ester bonds.

In addition to the polycarbonate resins described above, the oxazoline chain-terminating group (I) may be used to control the molecular weight of a polyarylate resin. Polyarylates are well known resins comprised of repeating carboxylate chain units as shown in the formula (IIb) given above, but without a carbonate unit. The polyarylate polymers, in general, are prepared by reacting an aromatic difunctional carboxylic acid or ester forming derivative thereof, and a dihydric phenol. Of course, polyarylates may be polymerized from a carboxylic acid/hydroxy functional monomer in a head-tail arrangement. The aromatic dicarboxylic acids and dihydric phenols described above for preparation of poly(ester-carbonates) may be used in the preparation of the polyarylate. In a preferred polyarylate the difunctional carboxylic acid residue portion contains residues of from about 95 to 0 mole percent of terephthalic acid and from about 5 to about 100 mole percent of isophthalic acid. More preferably, such polyarylates contain residues of a mixture of from about 30 to about 70 mole percent terephthalic acid and from about 70 to about 30 mole percent of isophthalic acid. A polyarylate containing residues of a mixture of 50 mole percent of terephthalic acid and 50 mole percent isophthalic acid is common. In general, these and other suitable polyarylates have a reduced viscosity of from about 0.4 to about 1.0 as measured in p-chlorophenol at 49° C. (0.2 g/100 ml.).

The polyarylates of the present invention can be prepared by any of the well known prior art polyester forming reactions, such as the reaction of the acid chlorides of the aromatic dicarboxylic acids with the dihydric phenol, the reaction of the diaryl esters of the aromatic dicarboxylic acids with the dihydric phenols, and the reaction of the aromatic diacids with diester derivatives of dihydric phenol. These processes are described in, for example, U.S. Pat. Nos. 3,317,464 3,948,856 3,780,148 3,824,213 and 3,133,898 all of which are incorporated herein by reference thereto.

In the conventional interfacial polymerization methods of preparing polycarbonates and polyarylates, a molecular weight regulator (a chain stopper) is generally added to the reaction mixture prior to or during the contacting with a carbonate and/or ester precursors. Useful molecular weight regulators include, but are not limited to, monohydric phenols such as phenol, chroman-I, para-tertiarybutylphenol, p-cumylphenol and the like. Techniques for the control of molecular weight are well known in the art and are used for controlling the molecular weight of the resins of the present invention.

The method of the present invention departs from the conventional interfacial polymerization methods for preparing polycarbonates and polyarylates by the use of a novel chain stopper. Employed as the sole chain stopper, or in combination with one or more of the aforementioned known chain stoppers is a compound of the formula:

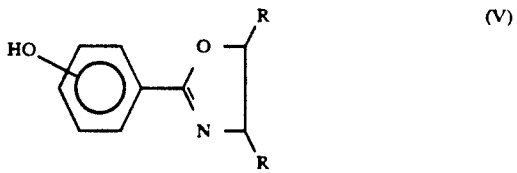

wherein R is as previously defined. The hydroxyl group reacts to end cap the resin chain. Representative of the compounds of formula (V) are 2-(m-hydroxyphenyl)-oxazoline and 2-(p-hydroxyphenyl)oxazoline, both of which are well known.

The novel carbonate or arylate polymers of the instant invention are prepared by reacting at least one compound of Formula (V) with a dihydric phenol and a carbonate and/or ester precursor. During the polymerization reaction the compounds of Formula (V) react with the phosgene and/or diacid chlorides to form the end groups present in the polymer.

Only one compound of Formula (V) need be used, in which case all of the end groups on the polymers will be the same, or one or more different compounds of Formula (V) may be used alone or in conjunction with known phenol and tertiary butylphenol chain terminators. In such instance the polymers will contain a mixture of end groups formed by the reaction of the various end capping agents with the polymer. The amount of the particular end capping agent used is determinative of the ratio of the resultant end groups present in the polymer.

The polycarbonate resins of the present invention may be represented by the schematic formula:

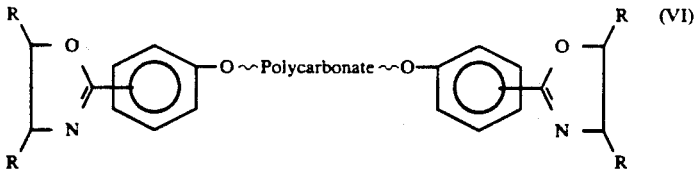

wherein R is as defined above. The end-capped polycarbonate resins of the formula (VI) are useful intermediates for the preparation of polycarbonate block copolymers, with polymers having reactive end groups such as carboxylic acids, anhydrides, amines, phenolic hydroxyls, mercaptans, epoxides and like groups. These polymers include polyesters, polyamides, polyimides, poly(ester-amides), polyphenylene sulfides, polyphenylene ethers and the like. The weight average molecular weight of the product resin can be controlled between about 10,000 and about 200,000 (as measured by gel permeation chromatography using polystyrene standard) depending upon the amount of the compound of Formula (V) employed. Generally, the greater the amount of the compound of Formula (V) employed in the reaction mixture the lower the weight average molecular weight of the carbonate polymer. Conversely, the smaller the amount of the compound of Formula (V) employed the higher the weight average molecular weight of the polycarbonate. The amount of the compound of the formula (V) employed is a terminating amount. By terminating amount is meant an amount effective to terminate the chain length of the carbonate polymer before the molecular weight of the polymer becomes too high and, consequently, the polymer becomes too viscous for any practical application; but not too high a concentration to terminate the polymer chain before a polycarbonate of useful molecular weight is formed. Generally, this amount ranges from between about 0.1 to about 25 mole percent based on the amount of the dihydric phenol present, preferably up to about 10 mole percent, most preferably from about 0.5 to 5 mole percent.

The following examples and preparations describe the manner and process of making and using the invention and set forth the best mode contemplated by the inventor of carrying out the invention but are not to be construed as limiting the invention. Where reported, the following tests were carried out.

Intrinsic Viscosity (I.V.)

The intrinsic viscosity was measured at a temperature of 25° C. in chloroform and is reported in deciliters/gram (dl/g).

Molecular Weight (Mw) and Number (Mn)

The weight average molecular weight (Mw) and number average molecular number (Mn) were determined by gel permeation chromatography (GPC) in chloroform relative to polystyrene standards using a UV detector at 254 nm.

Glass Transition Temperature (Tg)

The glass transition temperatures were determined by using a Perkin-Elmer DSC-2B instrument which measures the glass transition temperature or Tg) by differential scanning calorimetry.

PREPARATIONS I AND II

Preparation of 2-(p-Hydroxyphenyl)Oxazoline

I. Preparation of N-(2-hydroxyethyl)-p-hydroxybenzamide

A mixture of 128.40g (.60 moles) of phenyl-4-hydroxybenzoate and 36.97g 606 moles) of ethanolamine was heated to 150° C. while stirring under a nitrogen atmosphere. After 2 hours at 150° C. the amber melt was cooled to ~150° C. and then poured into 1000 ml of chloroform. Within a few minutes a solid yellow precipitate formed. The precipitate was isolated by vacuum filtration washed with fresh chloroform and then air dried. This material was identified by NMR and IR spectroscopy as N-(2-hydroxyethyl)-p-hydroxybenzamide. A 95% yield was obtained.

II. Preparation of 2-(p-hydroxyphenyl)-oxazoline

To a slurry of 18.0g (0.1 moles) of N-(2-hydroxyethyl)-p-hydroxybenzamide in 100 ml of ethyl acetate was added a solution of 23.80g (0.2 moles) of thionyl chloride in 25 ml of ethyl acetate. Thionyl chloride addition was slow enough to maintain the reaction temperature below 50° C. After 2 hours at room temperature the precipitate was collected by vacuum filtration and then dissolved in 200 ml of water. The solution was neutralized with 5% sodium hydroxide solution. The white precipitate which formed was collected by vacuum filtration and then dried in a vacuum oven at $\approx 70°$ C. overnight. This material was identified by NMR and IR spectroscopy as the desired 2-(p-hydroxyphenyl)-oxazoline. An 87% yield was obtained.

EXAMPLE 1

A slurry of 120.0g (0.526 moles) of bisphenol A, 2.58g (0.0158 moles) of 2-(p-hydroxyphenyl)oxazoline (Preparation II, supra.), 0.20g of sodium gluconate and 1 ml of triethylamine in 590 ml of methylene chloride and 450 ml of water was prepared. After adjusting the pH of the slurry to 11 with concentrated sodium hydroxide solution (50%), phosgene was added at a rate of 1.25g/min. for 45 minutes (56.25g, 0.57 moles). During the phosgene addition the pH of the reaction solution was maintained at 10.5 to 1.5 by adding concentrated sodium hydroxide solution dropwise. When the phosgene addition was complete the reaction was allowed to stir for an additional 10 minutes. The phases were separated and the methylene chloride layer was washed sequentially with 5% hydrochloric acid solution (1×500 ml), 5% sodium bicarbonate solution (2×500 ml) and water (5×500 ml). Coagulation in hot water produced a white fibrous precipitate that was collected by vacuum filtration, air dried then further dried in an air circulating oven at 125° C. for 16 hours. The resulting polycarbonate had an I.V. of 0.71 dl/g. as measured in chloroform. Proton NMR spectroscopy confirmed the presence of oxazoline termination on the polymer.

EXAMPLES 2-6

Example 2 was repeated except that the concentration of 2-(p-hydroxyphenyl)-oxazoline (HPO) was varied. Table 1 below summarizes the concentration of the 2-(p-hydroxyphenyl) oxazoline used and the I.V. of the resulting polycarbonate.

TABLE 1

| Example | Conc. of HPO[1] | I.V. (dl/g) |
|---|---|---|
| 2 | 3.0 | 0.71 |
| 3 | 3.5 | 0.59 |
| 4 | 4.0 | 0.21 |
| 5 | 3.5 | 0.63 |
| 6 | 4.0 | 0.25 |

[1]Mole % based on bisphenol A.

EXAMPLE 7

Polyarylate Resin

To a reaction vessel there is added 22.8 grams (0.1 mole) of bisphenol A, 0.9 gram (2 mole %) of 2-(p-hydroxyphenyl) oxazoline, 0.28 ml of triethylamine, 500 ml of methylene chloride, and 300 ml of water. This mixture is well stirred and to this stirred mixture is added dropwise a solution of 20.3 grams (0.1 mole) of isophthaloyl dichloride in 50 ml of methylene chloride, while maintaining the pH of the resulting mixture at 11 by the addition of a 25% aqueous sodium hydroxide solution via an automated titrator. When the pH remains constant the organic and aqueous phases are separated, the methylene chloride phase is washed with 0.01N aqueous HCl, 5% sodium bicarbonate solution followed by two water washings. The organic layer is then dried with silica gel, filtered and the polyarylate resin precipitated in methanol.

EXAMPLE 8

Oxazoline Terminated Poly(Ester-Carbonate)

To a reactor vessel there is added 400 ml of methylene chloride, 300 ml of Water, 34.2 grams (0.15 moles) of bisphenol-A, 0.48 grams (0.003 moles) of 2-(p-hydroxyphenyl) oxazoline, and 0.42 ml of triethylamine. At a pH of about 11, 18.3 grams (0.09 moles) of a mixture of isophthaloyl dichloride and terephthalyol dichloride (93:7 wgt. percent) dissolved in methylene chloride, 10 milliliters, is added over a 15 minute period, while maintaining the pH at about 11 by the addition of 35% aqueous caustic. After the addition of the isophthaloyl dichloride and terephtholyol dichloride (93:7 weight Percent) is terminated, 7 grams (0.07 moles) of phosgene is introduced over a 15 minute period, while controlling the pH at about 11 by the addition of 35% aqueous caustic solution. The polymer mixture obtained is diluted with methylene chloride and the brine phase separated. The resulting polymer containing phase is washed with HCl solution, sodium bicarbonate solution and then with water. The polymer is recovered by methanol precipitation. The resultant copolyester-carbonate is oxazoline terminated.

EXAMPLE 9

This is not an example of the invention but is made for purposes of comparison.

A 50/50 polycarbonate/polybutylene terephthalate (PBT) blend was prepared by mixing 25g of polycarbonate resin (Lexan ® 131; General Electric Co.) with 25g of polybutylene terephthalate (Valox ® 315 General Electric Co.) in a Haake mixing bowl at 250° C. After 15 minutes, the material was removed from the Haake and cooled. The resulting product was opaque and exhibited a glass transition temperature and melting point of 134° and 219° C., respectively. Using a Soxlet extraction technique the pure polycarbonate and polybutylene terephthalate components of the blend could be completely separated using methylene chloride as the solvent. All results indicate that no significant reaction between the two polymers occurred.

EXAMPLE 10

Example 9 was repeated except that the oxazoline terminated polycarbonate produced in Example 1 was substituted for the Lexan ® 131, supra. Unlike Example 9, the resulting product was transparent and exhibited a glass transition temperature of 78° C. During the differential scanning calorimetry measurements this material crystallized at 144° C. and subsequently melted at 214° C. Only 14% of the blend was soluble in methylene chloride indicating that a significant amount of polymer/polymer reaction occurred. In addition, even the methylene chloride soluble portion was not pure polycarbonate.

The resulting copolymers generated from the reaction of oxazoline terminated polycarbonates or polyarylates with another polymer are useful as injection molding and extrusion resins or as compatibilizers for blends consisting of similar components. For example, polycarbonate/nylon copolymers produced by the reaction of the oxazoline functionality with acid or amine end groups on the nylon could be used to compatibilize unreacted polycarbonate/nylon blends. Functional groups reactive with oxazolines include carboxylic acids, carboxylic anhydrides, phenolic hydroxyls, amines, mercaptans and epoxides. Polymers containing these groups include polyesters, polyamides, polyimides, poly(ether-imides), poly(amide-esters), poly(aryl ethers), poly(aryl ether sulfones), poly(aryl ether ketones), polyphenylsulfide and phenolics. The copolymers may be prepared by the melt blending (a well known technique) of the component polymers in any proportions, generally at least 5 percent by weight of the oxazoline-terminated polymer.

What is claimed is:

1. A copolymer of the resin of an aromatic polycarbonate or polyarlyate resin having a polymer chain terminated with a monovalent group of the formula:

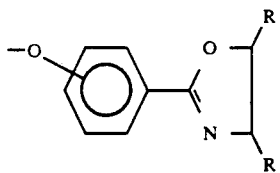

and (2) a second polymer resin containing functional groups reactive with the resin of (1) above wherein each R is independently selected from the group consisting of hydrogen and lower alkyl.

2. A copolymer of the resin of claim 1 wherein (2) is a polyester selected from the group consisting of polybutylene terephthalate and polyethylene terephthalate.

3. A copolymer of the resin of claim 1 wherein (2) is a polybutylene terephthalate.

4. A copolymer of the resin of claim 1 wherein (2) is a polyester.

5. A copolymer of the resin of claim 1 wherein (2) is a polyamide.

6. A copolymer of the resin of claim 1 wherein (2) is a poly(etherimide).

7. A copolymer of the resin of claim 1 wherein (2) is a poly(amide-ester).

* * * * *